UNITED STATES PATENT OFFICE.

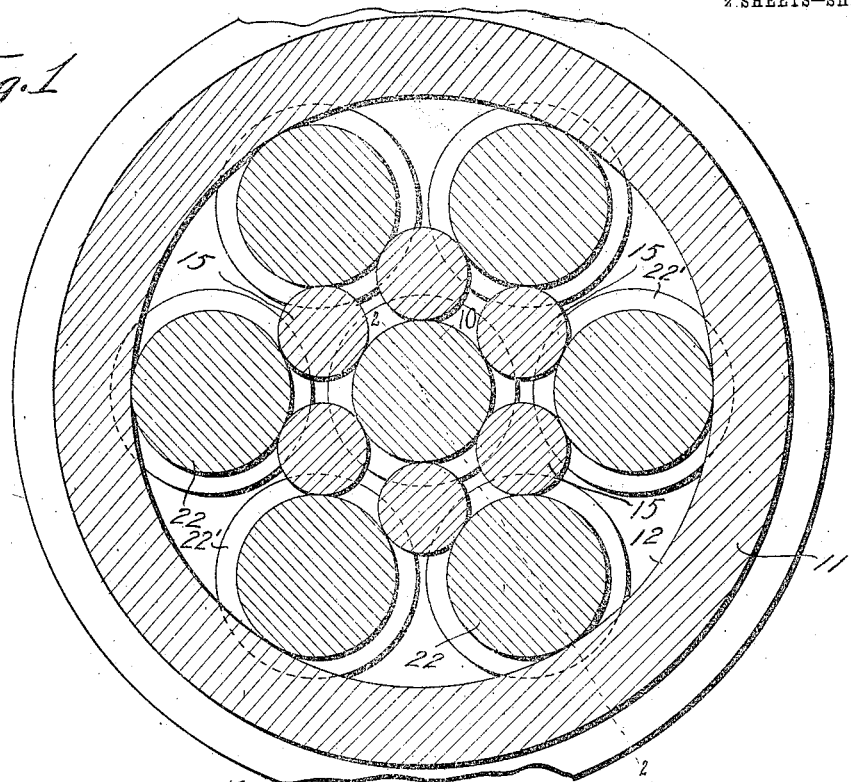
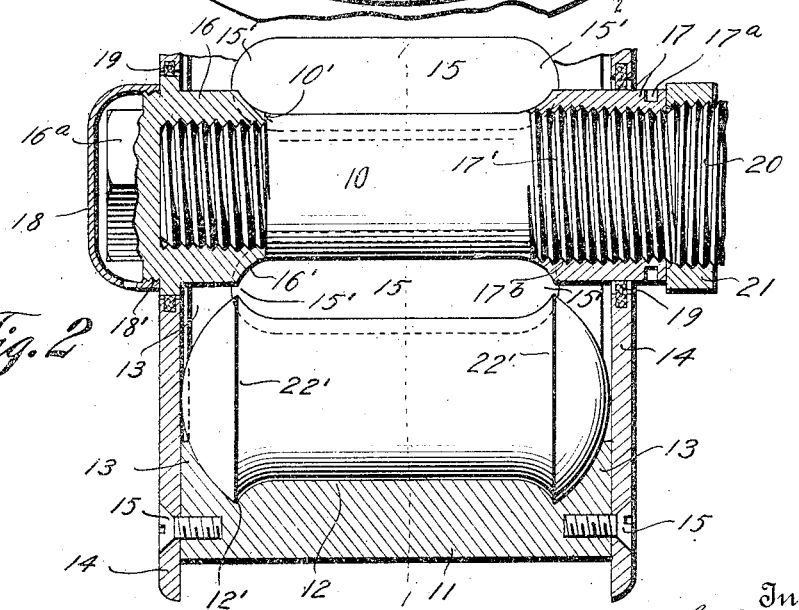

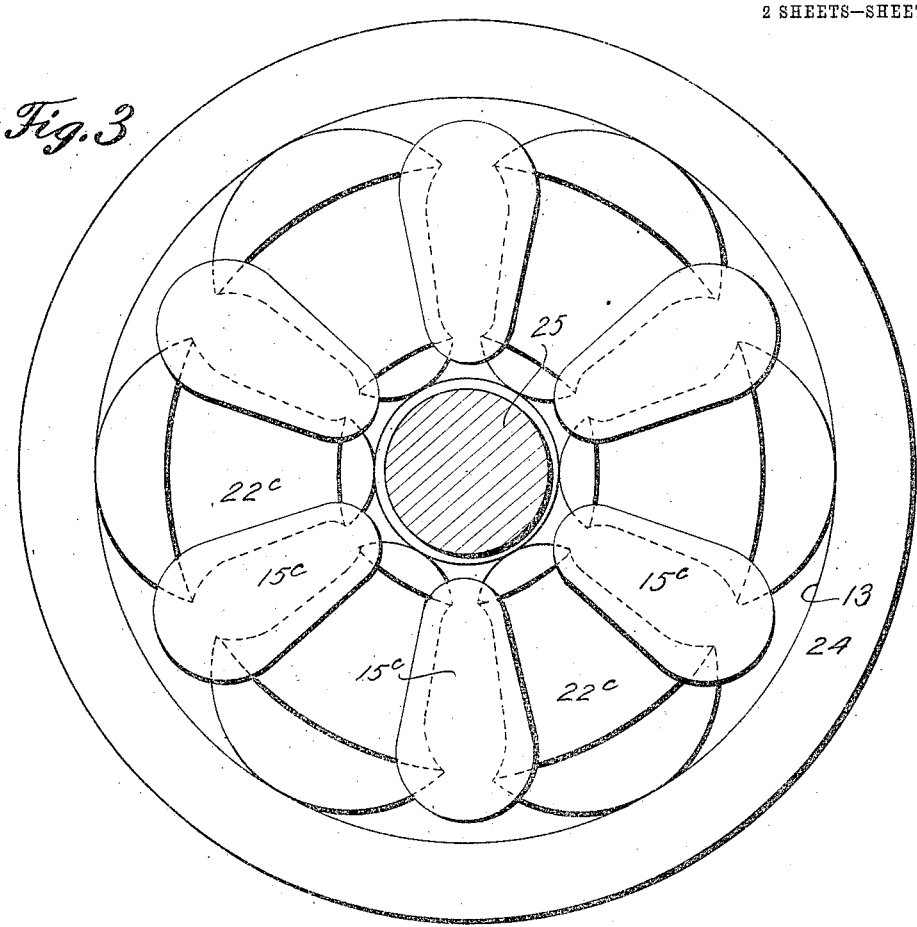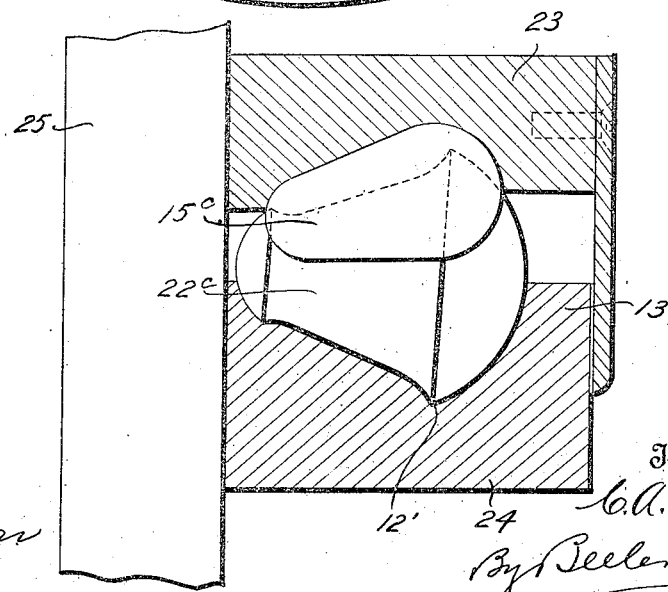

CHARLES A. L. BACH, OF PHILADELPHIA, PENNSYLVANIA.

ROLLER-BEARING.

1,036,538.    Specification of Letters Patent.    Patented Aug. 27, 1912.

Application filed November 10, 1909, Serial No. 527,269. Renewed January 20, 1912. Serial No. 672,476.

*To all whom it may concern:*

Be it known that I, CHARLES A. L. BACH, a citizen of the United States, residing at Philadelphia, in the county of Philadelphia and State of Pennsylvania, have invented certain new and useful Improvements in Roller-Bearings, of which the following is a specification.

This invention relates to the provision of anti-friction bearings for general application, and the invention consists in certain peculiar novel details of construction hereinafter fully described and claimed and illustrated in the accompanying drawings, in which:

Figure 1 is a vertical transverse section substantially on the line 1—1 of Fig. 2, illustrating the invention as applied to a stationary axle surrounded by a rotating hub or wheel; Fig. 2 is a fragmentary longitudinal section on the line 2—2 of Fig. 1; Fig. 3 is a plan view of a modified form of the invention, one of the bearing plates being removed, and Fig. 4 is a sectional view of the same modification corresponding to the view in Fig. 2.

Throughout the following description and on the several figures of the drawings similar parts are referred to by like reference characters.

Referring particularly to Figs. 1 and 2, at 10 is indicated a cylindrical spindle of a stationary axle about or upon which the bearing is to be employed. It is to be understood however that it is contemplated that the spindle and casing surrounding the same may be related to each other differently from that above described in that the casing may be a stationary box and within which the spindle may rotate as in the case of a car axle or a rotating line shaft, or machinery bearings generally. The casing or boxing 11 is shown as in the form of a hollow cylinder having a bearing track or surface 12 opposite the spindle 10 and the edges of which track 12 are formed with depressions or grooves 12' terminating in inwardly projecting flanges 13. At each end of the boxing 11 is an inclosure plate 14, the plates being connected to the boxing in any suitable manner, such for instance as by screws 15, whereby the boxing 11 and the end plates 14 constitute a substantially closed casing surrounding the spindle.

Any suitable number of sets of antifriction rollers may be interposed between the spindle 10 and the track 12 and said rollers may be of any suitable configuration within the spirit of this invention. As indicated however a series of smaller rollers 15 surround and contact the spindle 10, but the said rollers are spaced from one another so as to avoid rubbing contact. Each of the rollers 15 is provided with rounded or spherical ends 15' which coöperate with shoulders 16 and 17 on the spindle. The shoulder 16 consists of a nut screw threaded upon the end of the spindle and abutting snugly against a shoulder 10'. The nut is also provided with a curved raceway 16' adjacent to said roller for coöperation with the ends 15' of the rollers. The nut is substantially circular at that portion extending through and into the casing, but is provided upon its outer end with a polygonal portion 16ᵃ for the application of an ordinary wrench. In order to present a finished appearance and prevent obstruction or injury the said nut is inclosed by means of a metallic cap 18 screw-threaded at 18' to the nut. A gasket 19 may if desired be interposed between the nut and the adjacent edge of the end plate 14 for the purpose of excluding dust, dirt, or moisture. The shoulder 17 is screw-threaded by means of threads 17' of any suitable character upon the inner end of the spindle, and said shoulder 17 may be moved lengthwise of the spindle, by virtue of said screw-threads, if it is desired to adjust the bearing. The shoulder 17 is substantially cylindrical on its outer surface and may be provided with sockets 17ᵃ for the application of a spanner if desired for the purpose of adjustment. It is provided at its inner end also with a raceway 17ᵇ corresponding to the raceway 16' aforesaid and for a similar purpose. A gasket 19 may be employed in connection with this shoulder in the manner above suggested with reference to the nut 16. The spindle furthermore is provided with a screw-threaded portion 20, the threads of which are of an opposite character to the threads 17', and upon which a lock nut 21 is adapted to abut snugly against the inner end of the nut 17 and lock it from displacement.

At 22 are shown a series of larger rollers, of the same number as are used of the rollers 15 and whereby the said rollers 15 are spaced from one another and maintained in proper operative relation to the spindle.

By reason of the fact that the rollers 22 are larger in diameter than the inner rollers 15 said inner rollers are positively prevented from passing between the outer rollers and escape from contact with the spindle. I have found in practice that in previous devices of this character where the inner rollers are as large or larger than the outer rollers there is a tendency for the inner rollers to pass between the outer rollers, rendering the device impracticable. Each of the rollers 22 is provided with enlarged ends, providing raceways 22′ which coöperate with the edges of the raceway 12 on one side and with the ends 15′ of the inner rollers on the other side. The outer portions of the heads may be of any suitable or preferred form, but are shown as spherical and coöperate with the inwardly projecting flanges 13 aforesaid. It will be seen therefore that the edges of the heads coöperate with the grooves 12′ of the cylinder 11. It will be seen from the construction hereinbefore described that not only will the relative side thrust between the shaft and boxing be taken by the sets of rollers but also any tendency for end thrust will be counteracted by the coöperating flanges and shoulders of the moving parts.

That form of the invention illustrated in Figs. 3 and 4 is very similar in most respects to the form above described in that there are provided two bearing members, one of which is movable with respect to the other, and between which bearing members are interposed a plurality of sets of antifriction rollers. In this form of the invention however the two relatively movable bearing members are an upper disk 23 and a lower disk 24. Said disks are arranged substantially parallel to each other in horizontal planes and the one of which is movable around a central axis with respect to the other disk, said axis being vertical. This type of the invention is especially applicable in connection with car trucks and other forms of vehicles in which a central bolt is employed to connect the car or vehicle body to a supporting truck. In this instance a king bolt is indicated at 25 and with or around which one of the disks rotates with respect to the other. As in the former instance the interposed antifriction rollers comprise a series of smaller rollers 15ᶜ having spherical or rounded ends, and a series of larger rollers 22ᶜ, having enlarged ends or heads between which the smaller rollers operate. By reason of the fact that the rollers in this type of bearing are arranged radially with respect to the axis or king bolt it is important that the rollers shall be tapered or frusto-conical. The upper disk 23 is provided with raceways coöperating with the ends of the upper rollers 15ᶜ, and the lower disk 24 is provided with grooves and flanges corresponding to the grooves 12′ and flanges 13 of the above described casing, whereby end thrust upon the rollers will be resisted by coöperation of the rollers and said flanges and grooves.

It is to be understood that I do not desire to be limited to any particular materials of which the several parts of the invention may be constructed nor to any particular sizes or dimensions of the several parts.

I claim:

1. The hereindescribed roller bearing comprising, in combination, two relatively movable bearing members one of which is provided with a pair of raceways and the other of which is unitary and provided with a main bearing surface, a pair of spaced grooves, and a pair of flanges constituting raceways, a series of spaced rollers coöperating with one of said bearing members and having spherical ends coöperating with the first mentioned raceways, and a series of larger rollers coöperating with the other of said raceways and having enlarged end heads between which the first mentioned rollers operate and which heads extend into and coöperate with said grooves and flanges of the second mentioned bearing member, the opposite ends of said roller heads being spherical.

2. The hereindescribed roller bearing comprising, in combination, an axle having a shoulder, a nut screw-threaded upon said axle and abutting snugly against said shoulder, the adjacent end of said nut constituting a raceway, a sleeve on said axle spaced from said nut and adjustable toward and from the same, one end of said sleeve constituting another raceway, a series of rollers coöperating with said axle and whose ends coöperate with the said raceway, and a hollow bearing member surrounding said axle and provided with a smooth bearing surface along the edges of which are formed a pair of grooves and inwardly extending flanges, and a series of large rollers coöperating with said hollow bearing member and having enlarged heads extending into and coöperating with said grooves and flanges, said heads being spherical on their outer ends and between which heads the aforesaid round ended rollers are embraced, substantially as set forth.

In testimony whereof I affix my signature in presence of two witnesses.

CHARLES A. L. BACH.

Witnesses:
  Geo. L. Beeler,
  Arthur L. Bryant.